US012679051B2

(12) United States Patent　　　　　(10) Patent No.:　US 12,679,051 B2

Sauerland et al.　　　　　　　　　　(45) Date of Patent:　　Jul. 14, 2026

(54) METHOD AND ARRANGEMENT FOR MANUFACTURING A COMPOSITE PART

(71) Applicant: Airbus Operations GmbH, Hamburg (DE)

(72) Inventors: Lukas Sauerland, Hamburg (DE); Torben Jacob, Beckdorf (DE)

(73) Assignee: Airbus Operations GmbH, Hamburg (DE)

( * ) Notice:　　Subject to any disclaimer, the term of this patent is extended or adjusted under 35 U.S.C. 154(b) by 152 days.

(21) Appl. No.: 18/379,294

(22) Filed:　　Oct. 12, 2023

(65)　　　　　Prior Publication Data

US 2024/0131809 A1　　Apr. 25, 2024
US 2024/0227325 A9　　Jul. 11, 2024

(30)　　　Foreign Application Priority Data

Oct. 13, 2022　　(EP) ..................................... 22201271

(51) Int. Cl.
　　*B29C 70/44*　　　　(2006.01)
(52) U.S. Cl.
　　CPC ..................................... *B29C 70/44* (2013.01)
(58) Field of Classification Search
　　None
　　See application file for complete search history.

(56)　　　　　References Cited

U.S. PATENT DOCUMENTS

| 8,800,953 | B2 | 8/2014 | Morris | |
| 9,120,246 | B2 | 9/2015 | Oldroyd | |
| 9,238,335 | B2 | 1/2016 | Robins | |
| 9,757,876 | B2 | 9/2017 | Broeska | |
| 2011/0254189 | A1 | 10/2011 | Doyle | |
| 2013/0154154 | A1* | 6/2013 | Rodman | ............... B29C 43/003 |
| | | | | 264/257 |
| 2020/0147852 | A1* | 5/2020 | Clay | ....................... B29B 13/02 |
| 2021/0008765 | A1 | 1/2021 | Connell | |

FOREIGN PATENT DOCUMENTS

| DE | 102008054540 A1 | 6/2010 |
| DE | 102013006940 A1 | 10/2014 |
| EP | 1707344 A1 | 10/2006 |
| EP | 3740364 A1 | 11/2020 |

OTHER PUBLICATIONS

European Search Report for Application No. 22201271 dated Apr. 4, 2023.
Anonymous, "Heat Deflection Tempature," Wikipedia, Oct. 2, 2023.

* cited by examiner

*Primary Examiner* — Christopher T Schatz
(74) *Attorney, Agent, or Firm* — KDW Firm PLLC

(57)　　　　　ABSTRACT

An arrangement and method for manufacturing a composite part includes a mold, a composite material including fiber material and matrix material on a forming surface of the mold. To provide a simple and cheap technology for forming and optionally curing the component at the mold, the method includes providing a pressing tool made of semi-crystalline thermoplastic material in an amorphous state on the forming surface of the mold, forming the pressing tool by applying a pressure, that can be by expanding a hollow mandrel, and pressing the pressing tool against the mold, conducting crystallization of the pressing tool material by increasing the temperature of the pressing tool so material of the pressing tool is crystallized. Afterwards, the composite part may be hardened, such as by curing the composite part between the mold and the crystallized tube mandrel.

20 Claims, 2 Drawing Sheets

METHOD AND ARRANGEMENT FOR MANUFACTURING A COMPOSITE PART

TECHNICAL FIELD

The disclosure herein relates to a method and an arrangement for manufacturing a composite part, especially for an aircraft, using a mandrel technology.

BACKGROUND

For technical background and prior art, reference is made to the following citations:

[1] EP 3 740 364 A1
[2] US 2021/0 008 765 A1
[3] U.S. Pat. No. 9,757,876 B2
[4] WO 2021/076 777 A1
[5] US 2016/0 200 009 A1
[6] Heat deflection temperature—Wikipedia; download from https://en.wikipedia.org/wiki/Heat_deflection-_temperature on Sep. 30, 2022
[7] DE 10 2008 054 540 A1
[8] EP 1 707 344 A1
[9] US 2010 151 169 A1
[10] DE 10 2013 006 940 B4

If fiber composite parts with hollow bodies or undercuts are to be produced, so-called mandrel technologies are used. Preferred embodiments of the disclosure herein relate to such a mandrel technology. A mandrel (also referred to sometimes as core) fills a cavity or an undercut in the manufacture of fiber composite components, e.g., for preventing resin penetration and for allowing the laminate to be compressed.

Hollow mandrels (also referred to as tube mandrels) must be able to adapt to the contour they have to fill in order to transfer sufficient pressure to material to be consolidated, e.g., cured, such as laminate, and avoid bridging. They act as a separation layer between resin/laminate and compression medium such as a gas. Industrial applied tube mandrels rely on oversized thermoplastic hoses for this purpose, which enable this adaptation due to compensating folds. Even with compensation folds, bridging in small corner radii is still a problem and a time-consuming draping process is required. Alternatively, hollow mandrels used in conventional processes may also be pre-formed. This draping or preforming processes increase the cost of the related manufacturing processes.

SUMMARY

An object of the disclosure herein is to provide a method and an arrangement for manufacturing a composite part using a mold and a pressing tool such as a mandrel with less effort and less costs.

For achieving such object, the disclosure herein provides a method and an arrangement disclosed herein. Advantageous embodiments are disclosed herein.

The disclosure herein provides a method for manufacturing a composite part, preferably for an aircraft, the method comprising:

a) providing a mold;
b) providing a composite material including fiber material and matrix material on a forming surface of the hollow mold;
c) providing a pressing tool made of semi-crystalline thermoplastic material in an amorphous state on the forming surface of the mold;

d) forming the pressing tool by pressing the pressing tool against the composite material on the mold;
e) conducting a crystallization of the material of the pressing tool formed by step d).

Preferably, the pressing tool is a separation layer between resin/laminate and compression medium such as a gas.

An idea underlying the disclosure herein is to use a pressing tool made from plastic with a low forming temperature, to adapt the form of the pressing tool to the form of a mold, and then to make the material of the pressing tool stable against higher temperatures by targeted crystallization of the pressing tool material. This idea can be used for different molding procedures, especially vacuum molding procedures, during manufacturing of composite material components. According to some embodiments, a flat mold and a pressing tool in form of a foil can be used which is pressed by evacuating the space between the mold and the foil. Especially, the idea can be used for mandrels as pressing tools.

According to some embodiments, the composite material may comprise a thermoplastic material, wherein the composite component is cooled down after the forming step using the crystallized pressing tool. In most preferred embodiments, the composite material comprises thermos-curable matrix material, and a curing step is conducted after the forming step using the crystallized pressing tool.

According to a preferred embodiment, the disclosure herein provides a method for manufacturing a composite part, preferably for an aircraft, the method comprising:

a0) providing a hollow mold;
b0) providing a composite material with fiber material and thermo-curable matrix material inside the hollow mold;
c0) providing a hollow mandrel made of semi-crystalline thermoplastic material in an amorphous state inside of the hollow mold;
d0) forming the hollow mandrel by expanding the hollow mandrel, and pressing the mandrel against the mold;
e0) controlling the temperature of the hollow mandrel over the time so that material of the hollow mandrel is crystallized; and
f) curing the composite part between the mold and the crystallized hollow mandrel.

Preferably, steps d) or d0) comprise a thermo-forming process for adapting the pressing tool to the specific shape of the mold and hence the composite part.

Step e) or e0) could be conducted by increasing the temperature such that the pressing tool material is crystallized. In other embodiments, a temperature suitable for conduction step d) or d0) is just maintained over the time ("waiting") until material is fully crystallized.

In a specific example, a pressing tool consisting of a skin or foil from PET can be formed at 110° C., and the temperature of 110° C. is maintained until the material is crystallized in full. According to another example, steps e) or e0) comprise changing, especially increasing, the temperature of the pressing tool to a temperature where the crystallization is at optimum. For example, for PET, the temperature is set to 140° C. where the crystallization time has a minimum.

Preferably, step a) or a0) comprise providing the mold with a cavity. Preferably, step a) comprises providing the mold with an undercut.

Preferably, step b) or b0) comprise placing a laminate on a forming surface of the mold, especially inside the hollow mold. Preferably, step b) or b0) comprise providing fibers and a thermo-curable or a thermoplastic resin. Preferably, step b) or b0) comprise providing a prepreg material.

The pressing tool may have different shapes. Preferably, a hollow mandrel is used as pressing tool. Preferably, step c) or c0) comprise providing a bladder made from the semi-crystalline thermoplastic material. Preferably, step c) or c0) comprise providing a hose made from the semi-crystalline thermoplastic material. Preferably, step c) or c0) comprise providing pressing tool, especially the hollow mandrel, at a first temperature above the glass transition temperature. Preferably, step c) or c0) comprise providing the pressing tool, such as the hollow mandrel, from a semi-crystalline thermoplastic material chosen from the group consisting of polyethelyne (PE), polypropylene (PP), polybutylene terephthalate (PBT), polyethylene terephthalate (PET), polyetheretherketone (PEEK).

Preferably, step d) or d0) comprise increasing the pressure at a side of the pressing tool facing away from the composite material. Especially the pressure inside the hollow mandrel is increased. Preferably, step d) or d0) comprise pressing the fiber material and matrix material against the mold. Further, a region between the pressing tool and the mold where the composite material is arranged can be evacuated.

Preferably, step e) or e0) comprise maintaining an increased pressure for pressing the pressing tool against the composite material and the mold, especially an increased pressure inside the hollow mandrel in order to keep the pressing tool pressed against the mold. Preferably, step e) or e0) comprise controlling the temperature such that the pressing tool material is allowed to crystallize before a final curing temperature for curing the composite material is reached. Preferably, step e) or e0) comprise gradually increasing the temperature of the pressing tool such as the hollow mandrel.

Preferably, step f) comprises increasing the temperature from a temperature during which the crystallization took place to a curing temperature for curing the composite material. Preferably, step f) comprises maintaining the increased pressure, especially inside the hollow mandrel, in order to press the composite material against the mold during curing.

Preferably, the method comprises further the step g) removing the pressing tool (e.g., the hollow mandrel).

For removing the pressing tool, the pressing tool may be provided, at the side facing to the composite material, with a release layer in order enhance the possibility to remove the pressing tool by drawing it away from the composite component. Eventually, the pressing tool could also be melted away.

Preferably, the method further comprises the step h) removing the (cured or hardened) composite part from the mold.

According to another aspect, the disclosure herein provides an arrangement for manufacturing a composite part, preferably for an aircraft, the arrangement comprising a mold; a pressing tool made of semi-crystalline thermoplastic material in an amorphous state configured to be formed by being pressed against a forming surface of the mold; a heating device for heating the pressing tool to a controlled temperature (Ti, Tg, Tc); a pressure supply device for pressing the pressing tool against the forming surface of the mold; and a control device configured to control the heating device and the pressure supply device in order to carry out the method according to any of the preceding embodiments.

According to a preferred embodiment, an arrangement for manufacturing a composite part, preferably for an aircraft, the arrangement comprises: a hollow mold;

a hollow mandrel made of semi-crystalline thermoplastic material in an amorphous state configured to be formed inside of the hollow mold;

a heating device for heating the mandrel to a controlled temperature;

a pressure supply device for providing an increased pressure inside the hollow mandrel; and a control device configured to control the heating device and the pressure supply device in order to carry out the method according to any of the preceding embodiments.

Preferred embodiments of the disclosure herein relate to an in situ blow molded hollow mandrel. Especially, embodiments relate to a method for forming and curing a composite part using a mold and an in-situ blow molded hollow mandrel. Preferably, the hollow mandrel is formed in the mold and then stabilized, especially by crystallization.

Embodiments of the disclosure herein provide methods for forming composite parts between a mold and a pressing tool, wherein pressing tools neither require a preforming nor a draping process. Especially, semi-cured pressing tools are used.

Some embodiments of the disclosure herein provide a cheap hollow mandrel technology which can be used for curved profiles. Embodiments of the disclosure herein provide a cheap hollow mandrel technology for the production of semi cured hollow mandrels.

The hollow mandrel technology according to preferred embodiments of the disclosure herein can be used for curved profiles and does not require neither a preforming nor a draping process.

A hollow mandrel technology according to embodiments of the disclosure herein comprises a blow-molded hollow mandrel or other pressing tools such as forming foils or other separation layers having other open geometries, which can be formed at low temperatures. Preferably, the pressing tool is suitable to be formed by applying a pressurized medium such that it is pressed against the mold and automatically takes the form needed.

This means that a preforming process is not necessary, because the forming of the pressing tool such as a mandrel can take place at the beginning of the curing process (or during a forming process) of fiber composite material itself. To achieve this, a semi-crystalline thermoplastic material is used, which is in an amorphous state first. In the amorphous state, thermoplastics have a low heat deflection temperature (see [6] for definition of "heat deflection temperature") and can be easily formed, but are not able to resist to the high curing (e.g. 180° C. for typical aerospace grade composite materials) temperatures. However, over time at higher temperatures, the material crystallizes which massively increases its heat deflection temperature and barrier properties. In preferred embodiments, the force for forming is provided by an increased internal pressure which will also pressurize the laminate after the forming process. In preferred embodiments, the curing process is controlled in a way that the hollow mandrel material is allowed to crystallize before the final curing temperature is reached.

BRIEF DESCRIPTION OF THE DRAWINGS

Embodiments of the disclosure herein are explained below referring to the accompanying drawings in which.

DETAILED DESCRIPTION

Figure 1:
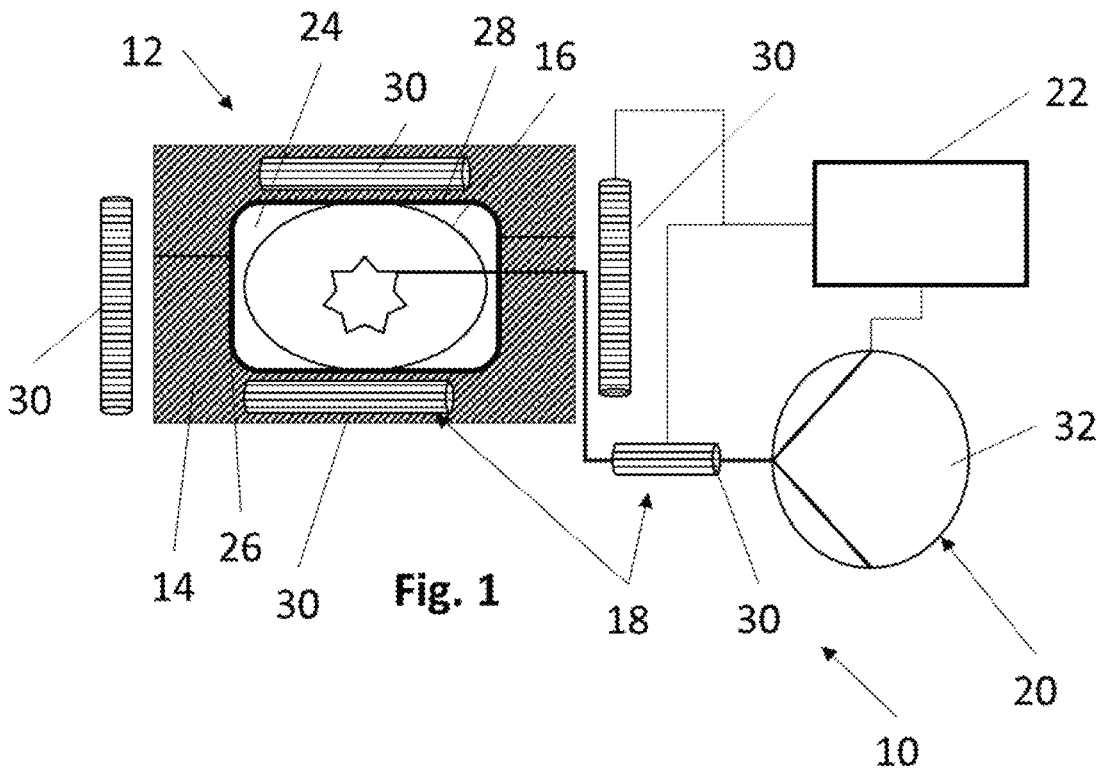
FIG. 1 is a schematic block diagram of an arrangement for manufacturing a composite part, especially a composite part for an aircraft.

FIG. 1 shows an arrangement 10 for manufacturing a composite part. The arrangement 10 comprises a forming tool 12 with a hollow mold 14, a pressing tool, here in form of a hollow mandrel 16, a heating device 18, a pressure supply device 20, and a control device 22. In the situation shown, the forming tool 12 is already provided with composite material for manufacturing a composite part 26.

In the embodiment shown, the hollow mold 14 encloses a cavity 24 wherein a composite part 26 can be formed and cured. Therefore, fiber material and matrix material are placed at the inside of the mold 14. The hollow mandrel 16 can be inserted into the cavity 24 and can be expanded in order to press the fiber material and the matrix material against the inner forming surface of the mold 14. While a mold 14 with a cavity 24 is shown, the technology works also with a mold with at least one undercut. Further, the technology also works with molds and other pressing tools having other shapes. For example, the mold can have an open geometry and the pressing tool may be a foil as a separation layer covering the composite material for conducting a vacuum pressing process.

Figure 2:
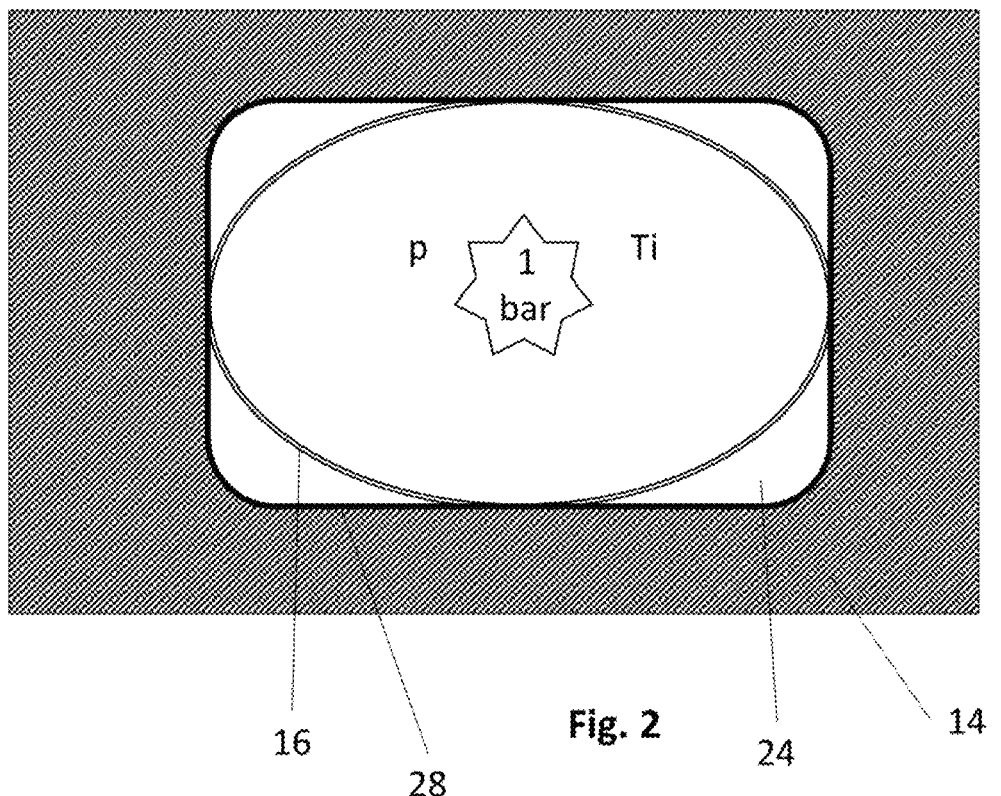
FIG. 2 is a schematic cross-sectional view of a forming tool and a pressing tool in the form of a hollow mandrel used in the arrangement of FIG. 1 at the beginning of a forming process for forming the hollow mandrel.

In some embodiments, a laminate 28 including fibers and matrix material is placed in or on (a forming surface of) the mold 14. The laminate 28 is configured to be cured at a curing temperature Tc, for example 180° in order to achieve the composite part 26. FIGS. 1 and 2 show the situation where still no or no significant difference pressure p is applied (p<1 bar).

The pressing tool such as the hollow mandrel 16 is made from semi-crystalline thermoplastic material which is provided in an amorphous state first. Examples for semi-crystalline thermoplastic materials are polyethelyne (PE), polypropylene (PP), polybutylene terephthalate (PBT), polyethylene terephthalate (PET), and polyetheretherketone (PEEK). The hollow mandrel 16 is formed as a bladder or a hose and includes an inlet for pressurized medium. By increasing an internal pressure p within the hollow mandrel 16, the hollow mandrel 16 can be expanded. Since the material is in the amorphous phase, this expansion can be easily achieved.

The heating device 18 includes one or several heating elements 30 and is controlled by the control device 22. The heating device 18 is configured to heat the hollow mandrel 16 to a controlled temperature Ti. In some embodiments, the heating device 18 is configured to heat pressure medium to be supplied inside the hollow mandrel 16 to a temperature Ti in accordance with commands from the control device 22. In some embodiments, a heating element 30 is arranged inside the hollow mandrel 16 or inside the forming tool 12 or outside the forming tool 12. Heating elements 30 may be part of an autoclave (not shown) in which the forming tool 12 is placed during the forming, crystallization and curing process.

The pressure supply device 20 includes a source of pressurized medium such as compressed air. For example, the pressure device 20 includes a pump 32. The pressure supply device 20 is controlled by the control device 22 and is configured to set a predefined pressure p in the interior of the hollow mandrel 16.

Also not shown, the arrangement 10 comprises a temperature sensor and a pressure sensor connected to the control device 22. The control device 22 is configured to set and regulate the temperature T within the cavity and the internal pressure p within the hollow mandrel 16 in accordance with a predefined mandrel forming process and composite part curing process. The control device 22 is preferably an electronic control unit ECU programmed with corresponding software.

In the following a method for manufacturing the composite part 26 is explained with reference to FIGS. 2 to 4.

As shown in FIG. 2, the laminate 28 is placed on the internal surface (example of a forming surface) of the hollow mold 14. The hollow mandrel 16 is provided with an initial size smaller than the cavity and with the semi-crystalline thermoplastic material in the amorphous state first. The hollow mandrel 16 is placed inside the mold 14 wherein the pressure p within the hollow mandrel 16 is at ambient pressure, e.g., 1 bar.

Figure 3:
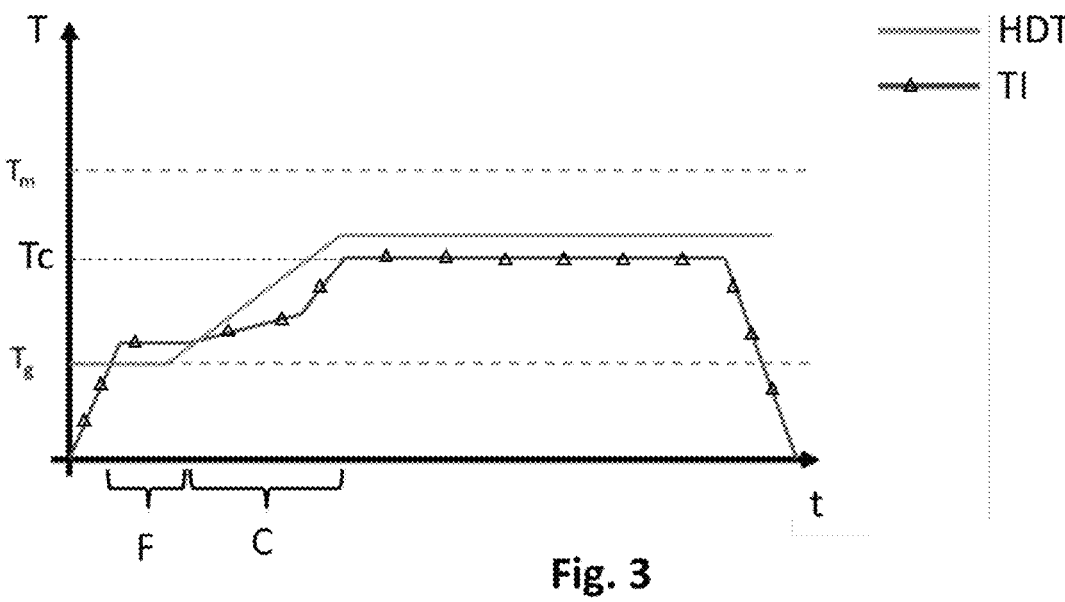
FIG. 3 is a chart illustrating the temperature Ti inside the forming tool and the heat deflection temperature of the hollow mandrel during a curing process for curing the composite part.
Figure 4:
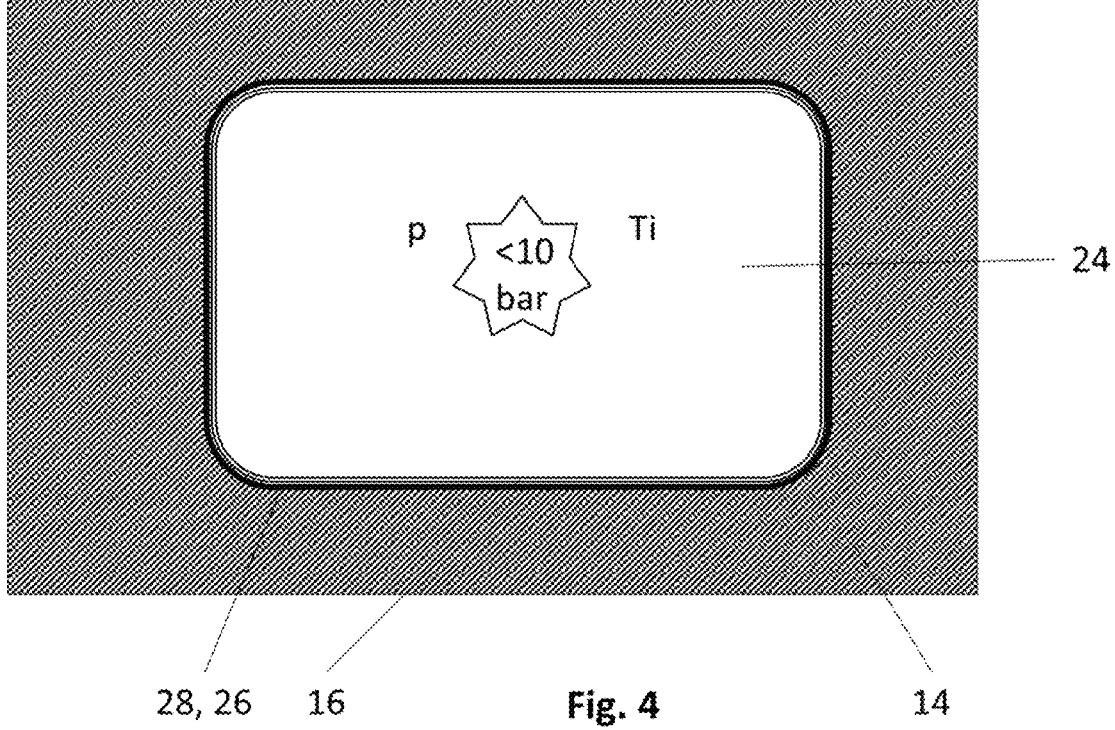
FIG. 4 is a schematic cross-sectional view of the forming tool and the hollow mandrel at the end of a blow molding process for forming the hollow mandrel.

FIG. 3 is a graph showing the temperature Ti of the hollow mandrel 16 over the time t and the heat deflection temperature HDT of the hollow mandrel 16. The heat deflection temperature HDT is defined as indicated in [6]. Tg illustrates a first temperature wherein the material of the hollow mandrel 16 can be easily formed. Tg is the starting temperature above which a thermo forming of the pressing tool such as the hollow mandrel 16 is possible. Tm illustrates a maximum temperature (melting temperature). Tc illustrates the curing temperature.

As shown in FIG. 3, the temperature Ti is first increased—due to automatic control of the control device 22—from ambient temperature above the temperature Tg (glass transition temperature) so that the material of the pressing tool—here the hollow mandrel 16—is amorphous and can be easily formed. The pressure p inside the hollow mandrel 16 is increased, and a forming process F starts, in which the hollow mandrel 16 is formed by being blown-up and expanded until the wall of the hollow mandrel 16 presses against the internal surface of the hollow mold 14 (with the still uncured laminate 28 therebetween). Thus, the hollow mandrel 16 is formed corresponding to the form of the mold 14. The end of the forming process F is shown in FIG. 4. For example, the pressure p inside the hollow mandrel 16 is increased to up to 10 bar.

After the forming process F, the temperature Ti is gradually increased while the high pressure p inside the hollow mandrel 16 is maintained. The temperature Ti is controlled such that a crystallization process C is conducted wherein the material of the hollow mandrel 16 crystallizes. For example, when using PET as pressing tool material, the forming process F is conducted at 110° C. According to an embodiment not shown, this temperature can be maintained after forming for conducting the crystallization process C. According to the embodiment shown, the temperature Ti is increased for conducting the crystallization process. For example, the crystallization time for PET has a minimum at 140° C. Hence, Ti may be raised to such a temperature where crystallization is conducted very quickly. The crystallization leads to a massive increase of the heat deflection temperature HDT and of the barrier properties of the hollow mandrel 16.

The temperature Ti is further increased to the curing temperature Tc. In this state, the curing of the laminate 28 is conducted, while the laminate is pressed by the formed and crystallized hollow mandrel 16 against the surface of the mold 14.

After curing, the hollow mandrel 16 is removed, and the composite part 16 can be removed from the mold 14. For an easier removal, the pressing tool may be provided with a release layer (not shown) at the contact surface contacting the composite material.

An arrangement and a method for manufacturing a composite part (26), preferably for an aircraft, have been described. The method comprises:

a) providing a mold, especially a hollow mold (14); and b) providing a composite material including fiber material and (preferably thermo-curable) matrix material on a forming surface of the mold (14).

In order to provide a simple and cheap technology for forming and optionally curing the component at the mold (14), the method further comprises:

c) providing a pressing tool, especially a hollow mandrel (16), made of semi-crystalline thermoplastic material in an amorphous state on the forming surface of the mold (14);

d) forming the pressing tool, especially by applying a pressure, e.g., by expanding the hollow mandrel (16), and pressing the pressing tool against the mold (14);

e) conducting crystallization of the pressing tool material, e.g. by increasing the temperature (Ti) of the pressing tool so that material of the pressing tool is crystallized.

Afterwards, the composite part (26) may be hardened, for example by conducting the step:

f) curing the composite part (26) between the mold (14) and the crystallized tube mandrel (16).

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 arrangement
12 forming tool
14 mold
16 hollow mandrel
18 heating device
20 pressure supply device
22 control device
24 cavity
26 composite part
28 laminate
30 heating element
32 pump
F forming process
C crystallization process
p pressure inside hollow mandrel
Ti temperature of the hollow mandrel (and inside the hollow mandrel)
HDT heat deflection temperature
T temperature
t time

The invention claimed is:

1. A method for manufacturing a composite part, the method comprising sequential steps of:

a) providing a mold, which comprises a part of a pressing tool;

b) providing a composite material including a fiber material and a matrix material on a forming surface of the mold;

c) providing a hollow mandrel, which comprises another part of the pressing tool and made of semi-crystalline thermoplastic material in an amorphous state on the forming surface of the mold;

d) forming the hollow mandrel by pressing the hollow mandrel against the forming surface of the mold;

e) conducting a crystallization of the material of the hollow mandrel formed by step d), and then curing the composite material to form a cured composite part;

f) removing the hollow mandrel from the mold; and g) removing the cured composite part from the mold after the curing of the composite material and after the hollow mandrel is removed from the mold.

2. The method according to claim 1, wherein:

the mold is a hollow mold;

the hollow mandrel is configured to fit inside the hollow mold;

in step d), the pressing by the hollow mandrel forms the hollow mandrel by expanding the hollow mandrel and pressing against the hollow mold; and step e) further comprises controlling a temperature of the hollow mandrel to perform the crystallization of the semi-crystalline thermoplastic material.

3. The method according to claim 1, wherein, in step e), the composite material is cured between the mold and the crystallized hollow mandrel.

4. The method according to claim 1, wherein, in step a):

the mold comprises a cavity; and/or the mold comprises an undercut.

5. The method according to claim 1, wherein, in step b):

the composite material is in a form of a laminate;

the fiber material comprises fibers and the matrix material comprises a thermo-curable resin or a thermo-plastic resin; and/or the composite material is in a form of a prepreg material.

6. The method according to claim 1, wherein, in step c):

the hollow mandrel is formed as a bladder or a hose;

the providing of the hollow mandrel is at a temperature above the glass transition temperature of the semi-crystalline thermoplastic material;

the semi-crystalline thermoplastic material is selected from a group consisting of polyethelyne, polypropylene, polybutylene terephthalate, polyethylene terephthalate, and polyetheretherketone; and/or the pressing tool comprises a skin or foil made from the semi-crystalline thermoplastic material.

7. The method according to claim 1, wherein step d) comprises one or more of:

increasing a pressure inside of the hollow mandrel;

pressing the fiber material and the matrix material against the forming surface of the mold; and evacuating a region between the forming surface of the mold and the hollow mandrel, wherein the composite material is arranged within the region.

8. The method according to claim 1, wherein step e) comprises one or more of:

increasing a temperature of the hollow mandrel during the crystallization of semi-crystalline thermoplastic;

keeping the hollow mandrel pressed against the mold with the composite material sandwiched therebetween;

maintaining an increased pressure inside the hollow mandrel to keep the hollow mandrel pressed against the mold; and controlling the temperature of the hollow mandrel, such that the hollow mandrel crystallizes before a final curing temperature is reached;

wherein the increasing of the temperature of the hollow mandrel is performed gradually.

9. The method according to claim 1, wherein the curing of the composite part between the mold and the crystallized hollow mandrel comprises:

increasing a temperature from a first temperature, at which the crystallization of the semi-crystalline thermoplastic material of the hollow mandrel occurs, to a curing temperature for the curing of the composite material; and/or increasing and maintaining a pressure inside the hollow mandrel to press the composite material against the forming surface of the mold during the curing.

10. The method according to claim 1, wherein the composite material is a different material from the material of the hollow mandrel.

11. The method according to claim 3, wherein the matrix material is a thermo-curable matrix material.

12. The method according to claim 1, wherein the matrix material is a thermo-curable matrix material.

13. The method according to claim 1, wherein, in step a):

the mold comprises a cavity; and the mold comprises an undercut.

14. The method according to claim 1, wherein, in step b):

the composite material is in a form of a laminate or a prepreg material; and the fiber material comprises fibers and the matrix material comprises a thermo-curable resin.

15. The method according to claim 1, wherein, in step c):

the hollow mandrel is in a form of a bladder or a hose;

the hollow mandrel is provided at a temperature above the glass transition temperature of the semi-crystalline thermoplastic material;

the semi-crystalline thermoplastic material is selected from a group consisting of polyethylene, polypropylene, polybutylene terephthalate, polyethylene terephthalate, and polyetheretherketone; and the pressing tool comprises a skin or foil made from the semi-crystalline thermoplastic material.

16. The method according to claim 1, wherein step d) comprises:

increasing a pressure inside of a portion of the pressing tool defined by the hollow mandrel;

pressing the fiber material and the matrix material against the forming surface of the mold; and evacuating a region between the forming surface of the mold and the hollow mandrel, wherein the composite material is arranged within the region.

17. The method according to claim 1, wherein step e) comprises:

gradually increasing a temperature of the hollow mandrel, during the crystallization of the semi-crystalline thermoplastic material;

maintaining an increased pressure inside the hollow mandrel to keep the hollow mandrel pressed against the mold; and controlling the temperature of the hollow mandrel, such that the hollow mandrel crystallizes before a final curing temperature.

18. The method according to claim 3, wherein curing the composite part between the mold and the crystallized pressing tool comprises:

increasing a temperature from a first temperature, at which the semi-crystalline thermoplastic material of the pressing tool crystallizes, to a curing temperature for curing the composite material; and increasing and maintaining a pressure inside the pressing tool to press the composite material against the forming surface of the mold during curing.

19. The method according to claim 1, comprising:

removing the pressing tool; and removing the composite part from the mold after the composite part is cured.

20. A method for manufacturing a composite part, the method comprising sequential steps of:

a) providing a hollow mold that has a forming surface, a cavity, an undercut, and is a part of a pressing tool;

b) providing a composite material, which is in a form of a laminate or a prepreg material and includes a fiber material, which comprises fibers, and a matrix material, which is a thermo-curable resin or a thermo plastic resin, on the forming surface of the mold;

c) providing a hollow mandrel, which is another part of the pressing tool, is made of a semi-crystalline thermoplastic material in an amorphous state, is in a form of a bladder or a hose, and is configured to fit inside the hollow mold, on the forming surface of the hollow mold, wherein:

the hollow mandrel is provided at a temperature above the glass transition temperature of the semi-crystalline thermoplastic material;

the semi-crystalline thermoplastic material is selected from a group consisting of polyethylene, polypropylene, polybutylene terephthalate, polyethylene terephthalate, and polyetheretherketone; and the pressing tool comprises a skin or foil made from the semi-crystalline thermoplastic material;

d) forming the hollow mandrel by:

pressing the hollow mandrel against the forming surface of the hollow mold;

increasing a pressure inside of the hollow mandrel;

pressing the fiber material and the matrix material against the forming surface of the hollow mold; and evacuating a region between the forming surface of the hollow mold and the hollow mandrel, wherein the composite material is arranged within the region;

e) controlling the temperature of the hollow mandrel to perform the crystallization of the semi-crystalline thermoplastic material of the hollow mandrel by:

gradually increasing temperature of the hollow mandrel to a first temperature, at which the crystallization occurs;

maintaining the increased pressure inside the hollow mandrel to keep the hollow mandrel pressed against the hollow mold with the composite material sandwiched therebetween;

f) curing the composite part between the hollow mold and the hollow mandrel by:

increasing the temperature of the pressing tool from the first temperature to a final curing temperature;

maintaining the increased pressure inside the hollow mandrel to press the composite material against the forming surface of the mold during the curing of the composite material;

g) removing the hollow mandrel from the hollow mold; and h) removing the composite part from the hollow mold.

* * * * *